US007010359B2

(12) United States Patent
Faulhammer et al.

(10) Patent No.: US 7,010,359 B2
(45) Date of Patent: Mar. 7, 2006

(54) METHOD AND DEVICE FOR SYNCHRONIZING DRIVE COMBINATIONS

(75) Inventors: Holger Faulhammer, Stuttgart (DE); Matthias Herden, Ludwigshafen (DE); Andreas Mallok, Wiesloch (DE); Eckehard Sommer, Dielheim (DE); Bernhard Wagensommer, Malsch (DE); Ralf Würdinger, Schwetzingen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 353 days.

(21) Appl. No.: 10/407,733

(22) Filed: Apr. 4, 2003

(65) Prior Publication Data

US 2003/0191544 A1 Oct. 9, 2003

(30) Foreign Application Priority Data

Apr. 4, 2002 (DE) ................................ 102 14 826

(51) Int. Cl.
*G05B 19/18* (2006.01)

(52) U.S. Cl. ........................................................ 700/3

(58) Field of Classification Search ................ 700/1–3, 700/8, 9, 28, 32; 318/77; 709/208–211; 710/110

See application file for complete search history.

(56) References Cited

U.S. PATENT DOCUMENTS

| | | | | |
|---|---|---|---|---|
| 5,283,506 A * | 2/1994 | Hoffmann et al. | ............ | 318/77 |
| 5,777,870 A * | 7/1998 | Takaku et al. | ................. | 700/3 |
| 5,988,846 A * | 11/1999 | Flamm et al. | ................. | 700/8 |
| 6,474,227 B1 * | 11/2002 | Narita | ......................... | 100/35 |
| 2002/0111696 A1 | 8/2002 | Albrecht et al. | ............... | 700/3 |

FOREIGN PATENT DOCUMENTS

| | | |
|---|---|---|
| DE | 100 27 775 A1 | 2/2002 |
| DE | 100 59 270 A1 | 6/2002 |

OTHER PUBLICATIONS

Bohrer, W.: “Exakt Synchron” [Exact Synchronic], Elektrotechnik für die Automatisierung, vol. 6, Jun. 8, 1998, pp. 30-33.

Weidauer, J.: “Servoantriebe—vom einfachen Steller zum intelligenten Systembaustein”, [Servo Drive—from the Simple Actuator to the Intelligent System Component], AGT, Apr. 1996, pp. 14-17.

König, U. et al.: “Frequenzumrichter für Papierabrollungen in Druckmaschinen”, [Frequency Converter for Paper Unwind Unit in Printing Machines], Antriebstechnik, vol. 39, No. 10, 2000, pp. 54, 56, 58, 59.

Hänsli, M.: “Gemischtes Doppel”, [Mixed Double], IEE, 42nd year, No. 11, 1997, pp. 138, 140, 143, 134-137.

* cited by examiner

*Primary Examiner*—Maria N. Von Buhr
(74) *Attorney, Agent, or Firm*—Laurence A. Greenberg; Werner H. Stemer; Ralph E. Locher

(57) ABSTRACT

A method is provided for synchronizing drive combinations having a plurality of drives for machines. The drives include at least one master drive and a plurality of slave drives assigned to the master drive. A central control unit is provided, as well as controls for each of the drives, including data processing and storage equipment. The slave drives are synchronized with respect to at least one of rotational speed and angular setting as prescribed by the master drive. The steps of the method, depending upon operating values of the master drive, include determining at least one synchronization function for each of the slave drives, determining master-synchronous operating values for each operating time for the respective slave drive with the synchronization function, and prescribing the determined operating values for the respective drive. A device for performing the method is also provided.

25 Claims, 4 Drawing Sheets

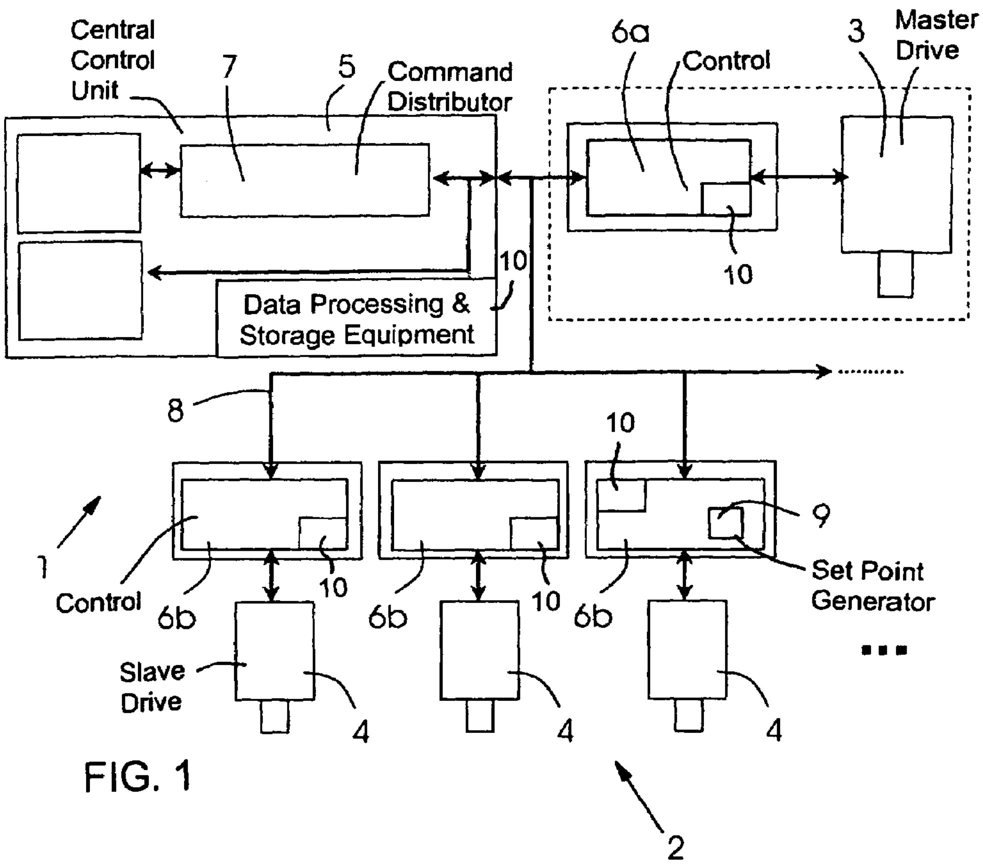
FIG. 1
FIG. 2
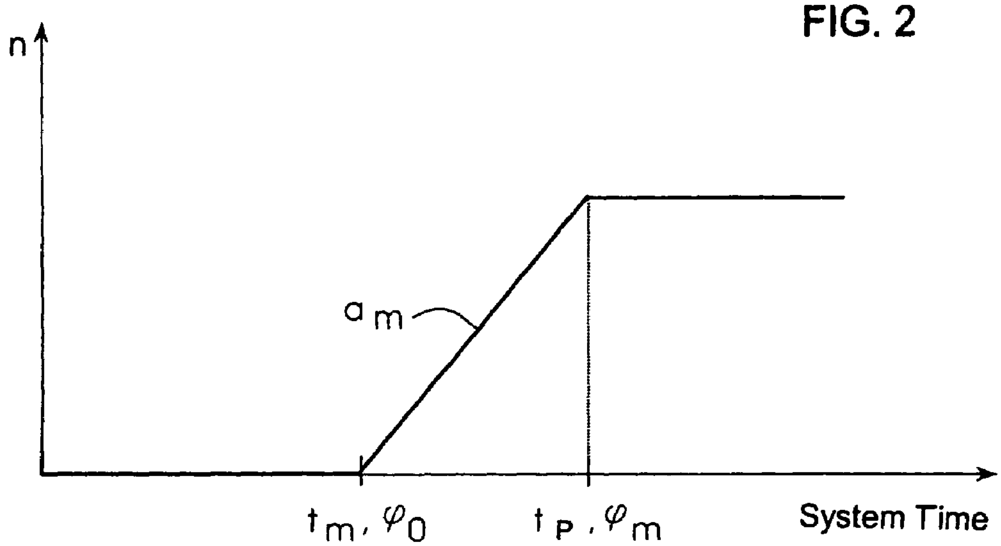

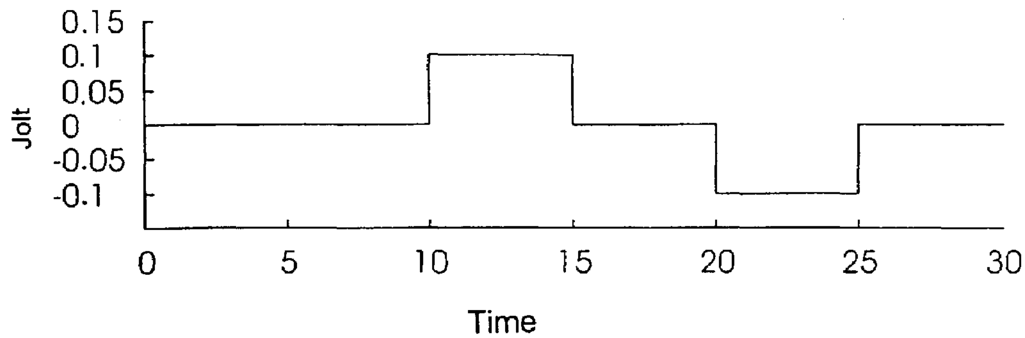
FIG. 4A
FIG. 4B
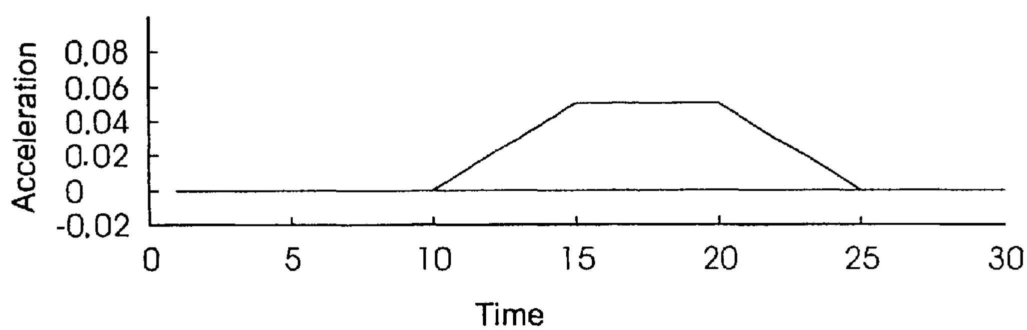
FIG. 4C
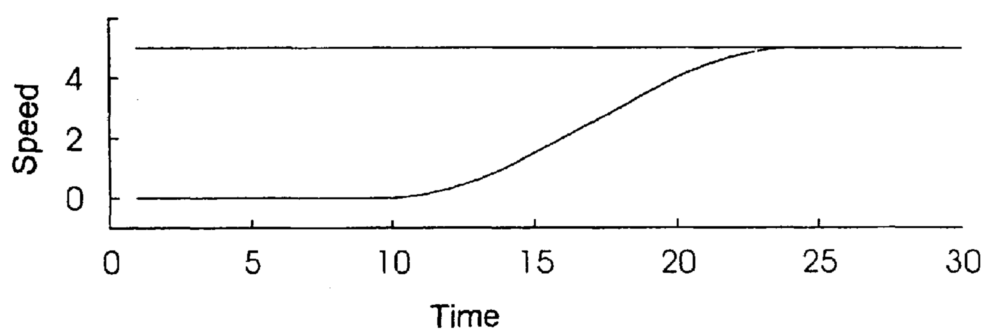

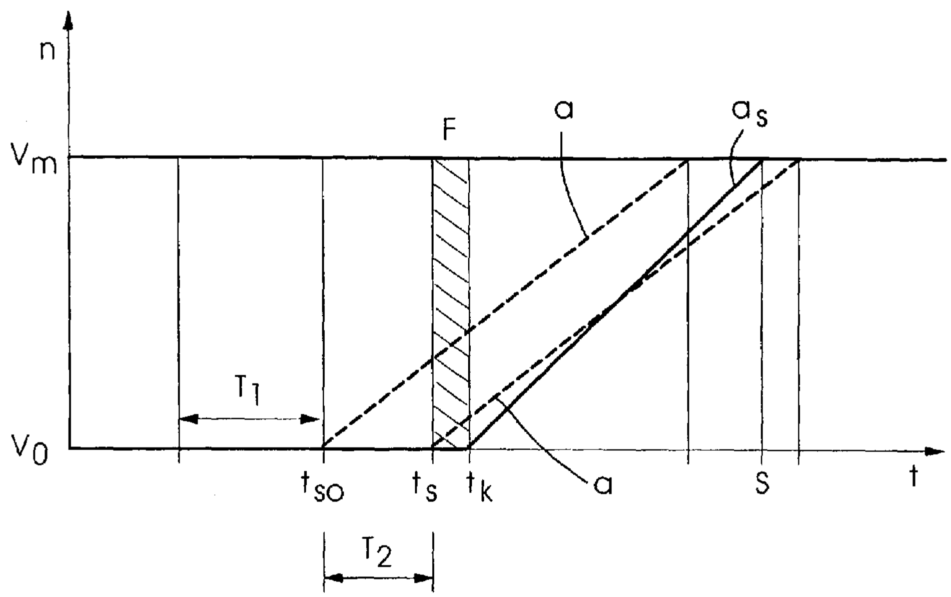
FIG. 5A
FIG. 5B
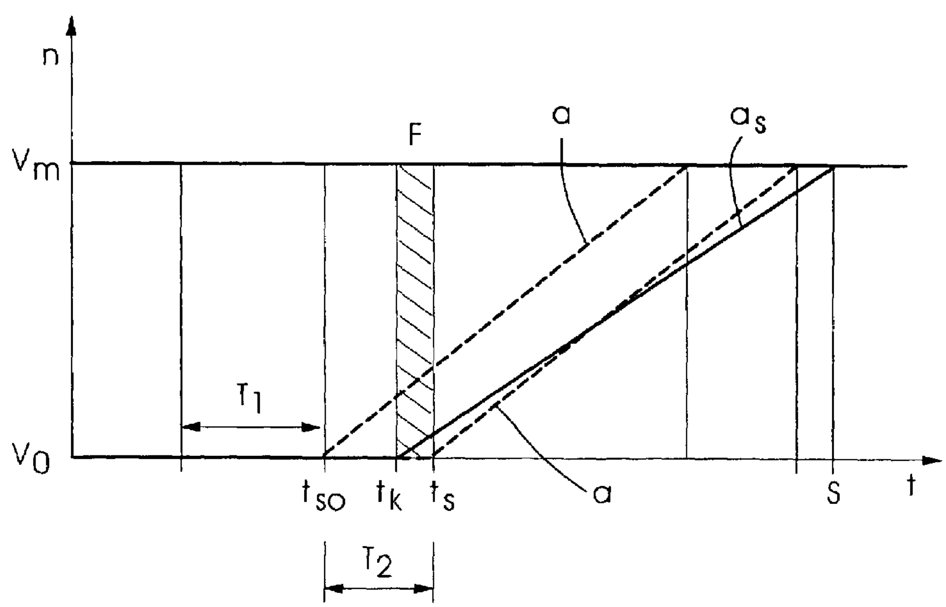

METHOD AND DEVICE FOR SYNCHRONIZING DRIVE COMBINATIONS

BACKGROUND OF THE INVENTION

Field of the Invention

The invention relates to a method and a device for synchronizing drive combinations made up of a plurality of drives for machines, preferably for printing presses, including at least one main drive (master drive) and at least one subordinate drive (slave drive) assigned to the main drive, as well as a central control unit. Each of the drives has a control system including data processing and storage equipment, and the slave drives are synchronized with respect to rotational speed and/or angular relationship as prescribed by the master drive.

Generally, combinations of various drives are controlled during the operation of a printing press. Those drive combinations must be synchronized with one another in order to ensure flawless operation. Different methods and devices have been provided for that purpose in the prior art, wherein set points or nominal values of the slave drives have been matched to actual values from a master drive.

For example, U.S. patent application Ser. No. 09/997,981, filed Nov. 29, 2001, entitled Method and Device for Synchronizing Processes which are Performed on a Plurality of Units, corresponding to German Published, Non-Prosecuted Patent Application DE 100 59 270 A1, contains a proposal for synchronizing the master drive and the slave drive or drives with a time cycle or clock rate of a central control. Respective set points or nominal values of then current and following processes can be calculated for the slave drives, by actual values cyclically sent by the master drive, and by mathematical computational models. It is thereby possible for the drives to be kept synchronized during then current processes by corrective measures, and starting processes can be started up at the correct time and at the correct angular setting. However, it has been shown that, in those methods, the set points or nominal values always have to be determined from the actual values by extrapolation. Inaccuracies thereby occur in prescribing the set points or nominal values, and cannot be disregarded any longer at high rotational speeds.

Knowledge about a further synchronization method, wherein actual values from a master drive are transmitted to controls of the slave drives, and set points or nominal values for the slave drives are determined by approximation calculations, can be obtained additionally from a publication entitled Sercos Interface—Technical Short Description, published by SERCOS N.A. of Crestview, Fla., and available as a download from its website. A disadvantage of that method is that, due to the influences of different factors, complicated adaptations of the set points or nominal values of the slave drives to the prescribed actual values from the associated master drive are required, and the synchronization must be updated by a continuous comparison between master and slave drives. Considerable computing effort and a considerable number of data transmissions between the individual controls and the central control unit are required.

SUMMARY OF THE INVENTION

It is accordingly an object of the invention to provide a method and a device for synchronizing drive combinations, which overcome the hereinafore-mentioned disadvantages of the heretofore-known methods and devices of this general type and with which the synchronization of the drives is performed at least approximately independently of actual values, so as thereby to avoid those disadvantages.

With the foregoing and other objects in view, there is provided, in accordance with the invention, a method of synchronizing drive combinations having a plurality of drives for machines, the plurality of drives being at least one master drive and a plurality of slave drives assigned to the master drive. The method comprises providing a central control unit, providing controls for each of the drives, including data processing and storage equipment, and synchronizing the slave drives with respect to at least one of rotational speed and angular setting as prescribed by the master drive. At least one synchronization function for each of the slave drives is determined depending upon operating values of the master drive. Master-synchronous operating values for each operating time for the respective slave drive are determined with the synchronization function. The determined operating values for the respective drive are prescribed.

In accordance with another mode, the method of the invention further includes effecting the prescription of the determined operating values of the master drive to the controls of the slave drives by the central control unit. Corresponding operating values for the respectively associated slave drive are determined with the operating values of the master drive.

In accordance with a further mode, the method of the invention further includes providing that the operating values of a respective drive include control commands for the angular setting, for the speed, for the acceleration, and for at least one of the command and system time.

In accordance with an added mode, the method of the invention further includes determining the start, end and course of at least one of a synchronization and the operation of a slave drive, with the synchronization function.

In accordance with an additional mode, the method of the invention further includes initially synchronizing one of the slave drives to the rotational speed of the master drive, with the synchronization function. A synchronization function with which the slave rotational speed is changed for a prescribed time after the master rotational speed has been reached is determined so that synchronism is effected between the angular settings of the drives, simultaneously with producing the rotational-speed synchronism.

In accordance with yet another mode, the method of the invention further includes determining an advance running time by which the start of the synchronization is delayed, before the start of the synchronization, in order to achieve rotational-speed and angular synchronism by the synchronization function.

In accordance with yet a further mode, the method of the invention further includes selecting an adequately long advance running time for determining an absolute value as a zero point for the calculation of the angular position.

In accordance with yet an added mode, the method of the invention further includes at least one of changing the synchronization profile and the time for at least one of the start and end of the synchronization. This is done so as to adapt the synchronization function for correcting systematic errors during at least one of the calculation and the prescription of operating values.

In accordance with yet an additional mode, the method of the invention further includes determining a change function for taking into account changes in the operating values of the master drive during the synchronization. The operating values of the slave drive determined by the synchronization function are adjusted to the change in the operating values of the master drive by the change function.

In accordance with still another mode, the method of the invention further includes providing for the change function to include the start, course and end of the change in the operating values of the master drive.

In accordance with still a further mode, the method of the invention further includes determining decentrally from the respectively associated control of the one slave drive, at least one of the synchronization function and the specific operating values of the slave drive. The at least one of the synchronization function and the specific operating values is prescribed for operation.

In accordance with still an added mode, the method of the invention further includes continuously compensating for differences in angle and rotational speed between master and slave drives during the synchronization.

In accordance with still an additional mode, the method of the invention further includes smoothing the at least one synchronization and change function by the data processing equipment for effecting the continuous compensation.

In accordance with another mode, the method of the invention further includes supplying the controls of the drives by a system time for generating an absolute time prescription. The system time is synchronized via a field bus.

In accordance with a further mode, the method of the invention further includes providing for the system time to be from the central control unit.

In accordance with an added mode, the method of the invention further includes determining by mathematical models at least one of the synchronization and the change function.

In accordance with an additional mode, the method of the invention further includes providing for the mathematical models to be adapted individually to the respective slave drive.

In accordance with yet another mode, the method of the invention further includes transmitting the operating values of the master drive from the central control unit to the controls of the drives via a command distributor.

In accordance with yet a further mode, the method of the invention further includes determining set points for the operating values by set point generators. At least one of the synchronization and change function is processed by the set point generators.

In accordance with yet an added mode, the method of the invention further includes providing the set point generators as integrated circuits.

In accordance with yet an additional mode, the method of the invention further includes storing at least one of the synchronization functions, the change functions and the operating values of the drives with storage equipment for subsequent operation.

With the objects of the invention in view, there is also provided a device for performing a method of synchronizing a drive combination having a plurality of drives for machines. The device comprises at least one master drive and at least one slave drive assigned to the master drive. A central control unit and decentral controls for individual drives of the drive combination include data processing and storage equipment. The at least one slave drive is synchronizable as prescribed by the master drive. At least one command distributor and data transmission equipment connect the central control unit and the controls to one another. Operating values of the master drive are transmittable to the controls of the drives for transmitting control commands to the drives. The operating values of each drive are calculable by the associated controls, storable and/or prescribable to the respective drive as the control commands.

In accordance with another feature of the device of the invention, the data transmission equipment has a field data bus connecting the controls of individual drives to the central control unit for transmitting at least one of the operating values and absolute time prescriptions for the central control unit.

In accordance with a further feature of the device of the invention, the field data bus is a controller area network (CAN) data bus.

In accordance with a concomitant feature of the device of the invention, the machines are printing presses.

Thus, according to the invention, provision is made, depending upon the operating values of the master drive, for at least one synchronization function to be determined for each slave drive, and for master-synchronous operating values for each operating time to be determined for the slave drive by the synchronization function, and to be prescribed for the drive.

In the master drive there exists information which is prescribed by the central control unit for operation. This information primarily includes the operating values. The operating values are at least approximately defined by the start time, the end time, the acceleration, the speed or rate of rotation and the angular position at a prescribed time.

The corresponding operating values can be calculated for each slave drive from these operating values. The master drive can be ensured with that synchronism. The only requirement for this purpose is to have the same system time as the time base for all of the drives. This is advantageously achieved by determining a synchronization function with which the profile of the movement of the slave drive at each time during operation can be determined from the operating values of the master drive and can be prescribed to the slave drive.

It is therefore advantageously possible to dispense with complicated calculations of deviations between set points and actual values and with propagation-time compensation based upon data transmission times. For one, this saves computing time in the respective central control unit and data processor. However, the data transfer via the data transmission members is also reduced, because it is possible to dispense with propagating synchronization data and control commands associated therewith, since these can be calculated decentrally by the controls of the slave drives.

Furthermore, by determining a synchronization function for the calculation of the operating values of a slave drive, it is made possible for the operating values of the slave drives to be calculated from the prescribed operating values of the master drive, quickly and without much computing effort, because the synchronization function can be applied directly to the operating values of the master drive, and thus the operating values of the slave drives are available immediately for driving the drives by the associated controls.

This is achieved by the fact that the central control unit prescribes operating values from the master drive to all the drives, and that by the synchronization function and with the operating values of the master drive, corresponding operating values for the respectively associated slave drive are determined.

For this purpose, all of the controls of the drives are driven by the central control unit with a specific set of commands. In this regard, provision is made for specific forms of movement of the drive to be describable by the set of commands, which, for example, contain speed profiles and absolute or relative positioning commands. In particular, a set of commands also contains the information about the time at which a control command is to be executed. For this purpose, the drives and the controls associated with the drives can preferably be supplied with a system time by the central control unit.

One drive is appointed as a virtual master drive for all the slave drives. In the case of sheet-fed offset presses, the main drive is regularly established as a virtual master. Another appointment is likewise covered by the invention, because the decentralized control which is achieved also permits the appointment of a subordinate drive as master drive.

Furthermore, provision is made for the operating values of a drive to include control commands for the angular position, for the speed, for the acceleration, and for the command and/or system time. What results therefrom is that the operating values are prescribed directly to the drives or can be processed by the controls. The control commands thus include all the data required for the movement of a drive. In this regard, provision is made for the start, end and course of a synchronization and/or the operation of a slave drive to be determined by the synchronization function.

The slave drive is initially synchronized to the rotational speed of the master drive by the synchronization function; after the master rotational speed has been reached, a synchronization function is determined with which the slave rotational speed is changed for a prescribed time. Thus, at the same time as the rotational speed synchronism is reproduced, synchronism between the angular positions of the drives can be achieved. In this configuration of the method, it is advantageously possible to dispense with the prescription of boundary conditions for the start of synchronization. It is possible first of all to produce rotational speed synchronism of the drives and then to determine what type the angular differences are. Proceeding therefrom, a synchronization function is determined which takes into account the initial rotational speed and the angular positions of the drive to be synchronized and then, by a chronologically restricted change in the rotational speed of the slave drive, adaptation of the operating values is effected, so that following the application of the synchronization function, synchronism between rotational speed and angle has been produced.

It is also expedient that, before the start of the synchronization, an advance running time is determined, by which the start of synchronization is delayed, in order to achieve rotational speed and angular synchronism, preferably simultaneously, by the synchronization function. If the absolute values of the slave drive necessary for determining the angular position are known before synchronization, it is possible first of all to calculate an advance running time with which, when the synchronization function is applied after a prescribed time period, synchronism both of rotational speed and of angle has been produced. The start of synchronization is then delayed by the advance running time. In this regard, it is advantageously possible for the start of synchronization to be delayed. An earlier start of synchronization could, however, likewise be considered.

By using the position and the rotational speed of the master drive, the controls of a slave drive can calculate its own synchronization function and determine the operating values at which, at a specific time, synchronous running of the two drives takes place. By the advance running time, it is possible to compensate for angular differences which would still occur in the event of calculated equality of the rotational speed. In order to ensure synchronous running without having to carry out additional corrections, the start time is determined at which the slave drive starts up, in order to achieve synchronous running exactly at the angular position at which the master and slave drives are synchronized in terms of rotational speed and angle. For this purpose, the calculated delay time is prescribed, which must be complied with when starting the slave drive in order to achieve synchronization in accordance with this prescription. In this regard, calculated angular differences are already avoided from the start of the slave drive, and errors can be taken into account in advance.

If the absolute values from the slave drive are not known before synchronization, it has proven to be advantageous for the advance running or prerunning time to be chosen sufficiently large for establishing an absolute value as a zero point for the calculation of the angular position. In this regard, provision is made for the prerunning or advance running of the slave drive to include a time period until the mark defined as the zero point of the drive has been passed. In the least favorable case, one revolution is needed for this purpose.

As a result of the discrete time clocking or cycling, systematic errors can occur during the synchronization. According to the invention, provision is made for the synchronization function to be adapted or adjusted, in order to correct for systematic errors during the calculation and/or during the prescription of operating values, by changing the synchronization profile and/or the time for the start and/or end of the synchronization. In this regard, the synchronization profile is matched to the determined system errors, by the synchronization function being adapted. If it is not possible to comply with the correspondingly prescribed time pattern, instead of the originally determined synchronization profile, a change is made in the synchronization function of the slave drive, and the start and end time for the synchronization and for running up the slave drive are matched or adjusted to the time clock.

For this purpose, the operating values of the master or slave drive for the synchronization are changed so that, in order to compensate for the system error, the start and/or end acceleration of the slave drive is corrected. The synchronization profile and, accordingly, the synchronization function are thereby adapted to the determined system error.

If the operating values of the master drive are to be changed during the synchronization, the invention, in order to take into account changes in the operating values of the master drive during the synchronization, provides for a change function to be determined, and for the operating values of the slave drive determined by the synchronization function to be matched to the change in the operating values of the master drive by the change function. By specific adaptation of the acceleration of the slave drive, account can thus advantageously be taken of the change in the master drive. For this purpose, a change function is determined which is applied to the operating values of the slave drive determined by the synchronization function, so that the synchronization profile of the slave drive follows the change in the operating values of the master drive without neglecting the synchronization conditions.

For this purpose, provision can be made for the change function to include the start, course and end of the change in the operating values of the master drive. If the master drive is changed during the synchronization, i.e., is accelerated or retarded, it is thus possible for the slave drive to be controlled in accordance with the synchronization function, by the change function, so that the synchronization is concluded before or after the change to the master drive has been completed. If synchronism is achieved before the change to the master drive is completed, the slave drive thus follows the progressive change to the master drive in accordance with the change function. On the other hand, if synchronism is only achieved later, the synchronization is continued unchanged by the fact that the synchronization function follows the completion of the change to the master drive.

The method according to the invention is also further developed by the synchronization function and/or the specific operating values of the slave drive being determined decentrally by the respectively associated controls of a slave drive, and being prescribed for operation. It is particularly advantageous, in this regard, that boundary conditions which are, respectively, individual to the drives can be taken into account with the synchronization function determined decentrally, and the operating values or the control commands can be determined immediately by the prescribed operating values. It is possible, thereby, to dispense with complicated approximation calculations, which are always subject to error and, therefore, make exact synchronizations more difficult.

Furthermore, it is expedient if, during the synchronization, differences in angle and rotational speed between master and slave drive are compensated for continuously, preferably by smoothing the synchronization and/or change function by a data processor. By using the latter, changes in the drive operation during synchronization are advantageously avoided, wherein the change in the acceleration (jolt or step) in the set point assumes an infinite magnitude. It is possible to perform appropriate smoothing as early as when determining the synchronization and the change function, respectively, in order to avoid an undefined response of the drives at the current limit.

In this regard, it is more advantageous that, in order to achieve continuous drive operation during the synchronization, in the event of changes in the operating values of the slave drives and adaptations of the synchronization functions, control commands are adapted continuously and constantly to the new prescriptions. This avoids jolt or step-like accelerations from remaining during the synchronization. This is because, particularly when accelerating a drive, the actual acceleration value could not follow the set point during the current rise time, as a result of which a non-steady-state behavior of the drive during acceleration would become possible. In addition, in the case of specific drives, for example in the case of a belt drive, a jolt could be transmitted to a sheet lying on the belt and the sheet could possibly be displaced on the belt. By constant synchronization, this effect can largely be eliminated.

Jolt-like or step-like adaptations are thereby advantageously avoided, which could otherwise lead to displacements of the printing material, the adaptations determined to the differences in angle and rotational speed being carried out continuously or constantly on the machine side by prescribing appropriately calculated control commands to the drives during the synchronization.

The controls of the drives can be supplied by a system time, preferably from the central control unit, in order to generate an absolute time prescription, and the system time can be synchronized via a field bus. In this way, the same system time is transmitted to all the drives and makes it possible for operating values to be determined for the master drive for every time, those operating values being the ones with which the corresponding operating values of the slave drives must correspond. The calculations of the operating values of the slave drives are thus made easier, because a time base is present on the slave drive and, via a data processor, the profile of the rotational speed or acceleration of the master drive can be simulated, with which the slave drive can calculate the position of the master drive at any time within specific tolerances and, accordingly, the required operating values for the slave drive can be determined.

The method is developed in an advantageous way in that the synchronization and/or change function is determined by mathematical models, which are preferably adapted individually for each slave drive. In order to permit rapid calculation of control commands, a mathematical model for the synchronization function is determined, taking into account the boundary conditions for the synchronization and the profile. To this end, provision is made for the model to be adapted to the individual prescriptions of the drive in the course of a plurality of synchronizations, and in this way a mathematical model to be developed and stored as a synchronization function which is coordinated completely with the drive.

Furthermore, provision is made for the operating values of the master drive to be transmitted from the central control unit to the controls of the drives via a command distributor. Simultaneous transmission of the control commands from the master drive to all the drives is thus ensured, the controls of the latter then being able to calculate the control commands which then ensure synchronous running. In this regard, the controls of the master drive and those of the slave drives calculate the control commands at least approximately simultaneously, so that delays in driving the different drives can be avoided.

If simultaneous transmission of the control commands from the master drive to all the drives cannot be ensured, then the starting time of the master command is delayed into the future to such an extent that each slave drive has sufficient time to receive the control command from the master drive and to determine the synchronization or change function. Further synchronization errors are avoided by a standardized system time.

Furthermore, one advantageous refinement of the method is achieved by set points for the operating values, preferably by determining the angular position, the speed and/or the acceleration by set point generators, and by having the set point generators preferably process the synchronization and/or change function as integrated circuits. The set points can thereby be determined rapidly. It has proven to be particularly advantageous to take the synchronization or change function into account for determining the set point. In this way, the computing effort, in particular the computing time, is reduced.

A further mode of the method results from the synchronization functions, the change functions and/or the operating values of the drives being stored by storage equipment for subsequent operation. This makes it possible to avoid a necessity for having the absolute values of the drives be determined during the first synchronization, by making use of operating values already determined earlier.

An achievement of the method, in particular, is that, in a composite drive with electronic shafts which can be synchronized in control terms, stationary slave drives of the composite drive can be synchronized with respect to rotational speed and angular position with a master drive that is already rotating. This is achieved with the aid of a conventional data field bus for the transmission of the operating values. In this regard, it is possible to dispense with a fast set point bus, so that cost advantages in production are possible.

As a result of sending the operating values of the master drive to all the controls of the slave drives, the start and end time of the control command from the master drive, the acceleration of the master drive and the angular setting or position thereof in relation to the end time of the control command, and also the final rotational speed reached after the end of the control command, are known.

The operating values of the slave drive are calculated by a data processor of the controls. In this regard, the profile of the rotational speed or acceleration of the master drive can be simulated. This makes it possible for the controls of the slave drive to calculate the position of the master drive at any time within specific tolerances.

Furthermore, the invention includes a device for implementing the method. The device has at least one central control unit and decentral controls for individual drives of a drive combination for machines, preferably for printing presses, having data processing and storage equipment. The drives include at least one main drive (master drive) and at least one subordinate drive (slave drive), and the slave drives can be synchronized as prescribed by the master drive.

To this end, provision is made for the central control unit and the controls to be connected to one another via at least a command distributor and data transmission members and, in order to transmit the control commands to the drives, for it to be possible for operating values of the master drive to be transmitted, preferably simultaneously, to the controls of the master drive and the slave drives, and for the operating values of each drive to be calculated by the associated controls, to be stored and/or to control the drive as control commands. To this end, provision is further made for the data transmission means to have a field data bus, preferably a CAN data bus, which connects the controls of individual drives to the central control system for transmitting, preferably simultaneously, the operating values and/or absolute time prescriptions.

Other features which are considered as characteristic for the invention are set forth in the appended claims.

Although the invention is illustrated and described herein as embodied in a method and a device for synchronizing drive combinations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of the device for synchronizing drive combinations according to the invention;

FIG. 2 is a graphic representation of a speed plot diagram of a master drive;

FIG. 4A is a graphic representation of a jolt-limited speed profile of the slave drive;

FIG. 4B is a graphic representation of a jolt-limited acceleration profile of the slave drive;

FIG. 4C is a graphic representation of the jolt course or profile of the slave drive;

FIG. 5A is a graphic representation of a speed plot diagram of the slave drive, taking into account synchronization errors due to synchronization delay; and FIG. 5B is a graphic representation of a speed plot diagram of the slave drive, taking into account synchronization errors due to synchronization acceleration.

DESCRIPTION OF THE PREFERRED EMBODIMENTS

Figure 3A:
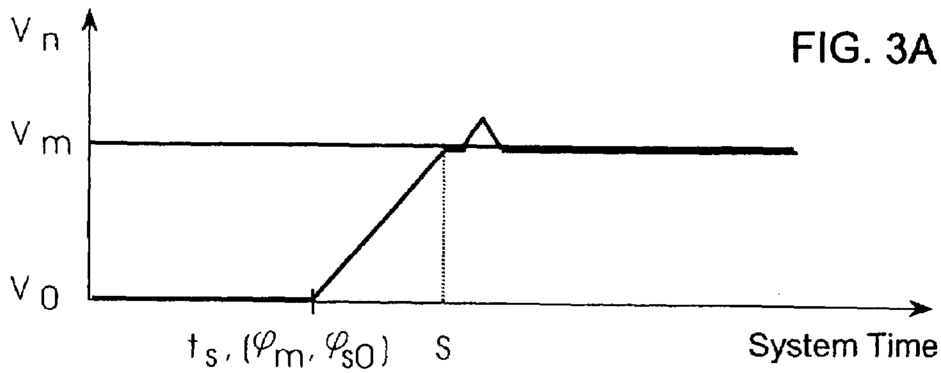
FIG. 3A is a graphic representation of a speed plot diagram of a slave drive for constant movement of the master drive with delayed angular synchronization.

Referring now to the figures of the drawings in detail and first, particularly, to FIG. 1 thereof, there is seen a block circuit diagram of a device 1 for synchronizing drive combinations 2. Drive combinations of this type are used, for example, in printing presses, wherein a main drive has a plurality of subordinate drives assigned thereto. In this regard, the main drive is preferably defined as a master drive 3, and the subordinate drives as slave drives 4.

In order to control the individual drives 3, 4, the printing press is provided with a central control unit 5 and controls 6*a* and 6*b*. The controls 6*a* and 6*b* and the central control unit 5 are connected to one another, preferably in parallel, via a command distributor 7 and data transmission elements 8. Additionally, each of central control unit 5 and controls 6*a* and 6*b* includes data processing and storage equipment 10.

Control commands from the master drive 3 are transmitted from the central control unit 5 to the controls 6*a*, 6*b*. In this regard, both the controls 6*a* of the master drive 3 as well as the controls 6*b* of the slave drives 4 are preferably driven simultaneously via the command distributor 7.

The respective controls 6*a*, 6*b* have a set point or nominal value generator 9, which respectively calculates and prescribes, from the received control commands, the set points or nominal values required for the angular setting or position, the respective rate of rotation and speed and, if necessary or desirable, the acceleration for the respective drive 3, 4.

After the operating values of the master drive 3 have been transmitted from the central control unit 5 via the data transmission elements or field data bus 8 to the controls 6a, 6*b* of the master drive 3 and the slave drives 4, the respective operating values for each of the drives 3, 4 are calculated by the respective controls 6*a* and 6*b* assigned thereto. In this regard, a synchronization function is determined by the control 6*b* of each slave drive 4. Through the use of that function, the synchronization of the slave drive 4 to the corresponding operating values from the master drive 3 can be performed for a prescribed synchronization time $t_s$. These synchronization functions are then stored and prescribed as control commands for the respective drive 3, 4.

FIG. 2 is a graphic representation of a speed plot diagram of the master drive 3. In this regard, the master drive 3 is started at a prescribed starting time $t_m$ at a given angular setting or position $\phi_0$. It is accelerated at a given acceleration $a_m$ up to the speed $v_m$. In accordance with the acceleration $a_m$, the speed $v_m$ is reached at a specific angular position $\phi_m$ at the time $t_\phi$.

With these operating values, it is possible to determine the corresponding operating values for a slave drive which, at a prescribed time, the synchronization time $t_s$, produce synchronism between master and slave drive. For this purpose, in accordance with the invention, there is proposed that a synchronization function be determined for each slave drive, which takes into account the operating values of the master drive and with which the operating values of the slave drive corresponding thereto, with regard to angular and rotational-speed synchronicity, are calculable.

Figure 3B:
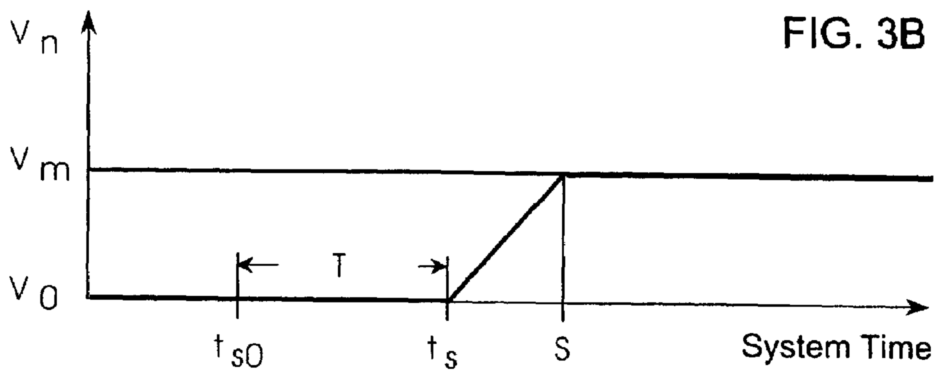
FIG. 3B is a graphic representation of a speed plot diagram of the slave drive for constant movement of the master drive with simultaneous angular synchronization.
Figure 3C:
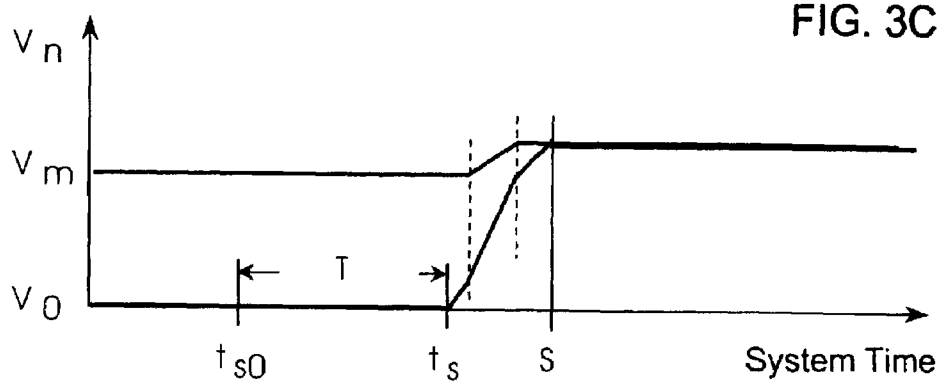
FIG. 3C is a graphic representation of a speed plot diagram of the slave drive for a changed rotational speed of the master drive with matched slave synchronization, wherein the change ends before the synchronization time.

FIGS. 3A to 3C illustrate different speed plot diagrams for a slave drive, with which, according to the invention, slave drives can be synchronized with the master drive. At the start of the synchronization, the slave drive has the initial speed $v_0$, it being possible for the initial speed $v_0$ to assume the value zero or a prescribed initial value. In the first case, the slave drive has not been in operation before synchronization, so that the controls have to determine the angular setting or position assigned thereto, if the angular setting or position has not previously been stored or is known as a result of using a suitable transmitter element (for example an absolute value transmitter element). With this basic setting, it is possible to determine the operating values for the synchronization.

If the zero position has not yet been prescribed, the synchronization can be performed in accordance with FIG. 3A, wherein the slave drive is synchronized with delayed angular synchronization, assuming constant movement of the master drive. To this end, the slave drive is accelerated to the speed and rate of rotation $v_m$, respectively, of the master drive. In the process, it is necessary to take into account the fact that the slave drive is given a zero pulse, representing the zero position, during this operation, which takes place within at least one revolution of the slave drive. The angular setting or position $\phi_{S0}$ of the slave drive as well as a synchronization function are then determined, with which the calculated angular difference $\phi\Delta=\phi_m-\phi_{S0}$ between master and slave drive can be corrected.

The correction is made in that, by employing the synchronization function, a change in the rotational speed and angular setting or position is calculated, and with this change, the slave drive can be synchronized. By a time-restricted change in the rotational speed of the slave drive, rotational-speed and angular synchronism are thus achieved.

By using the synchronization function, the operating values of the slave drive for the further course of operation can then be determined and prescribed for the drive. If the zero position of the slave drive is known at the start of synchronization, or if the slave drive is controlled so that the zero position can be determined before the synchronization, it is thus possible to determine the synchronization function before the starting time of the synchronization, with which rotational-speed and angular synchronism are simultaneously achievable.

FIG. 3B shows a speed plot diagram, wherein rotational speed and angular setting or position are synchronized simultaneously at constant rotational speed of the master drive. For this purpose, before the start of the synchronization, by using the operating values from the master drive, a lead or advance running time T is calculated, by which the starting time $t_{S0}$ of the synchronization must be changed in order to be able to synchronize both rotational speed and angular setting or position of the drives at a prescribed synchronization time S. The synchronization accordingly begins at the time $t_s=t_{S0}+T$.

FIG. 3C is a graphic representation of a speed plot diagram of the slave drive for a changed master rotational speed and adapted or matched slave synchronization, wherein the change ends before the synchronization time S.

Figure 3D:
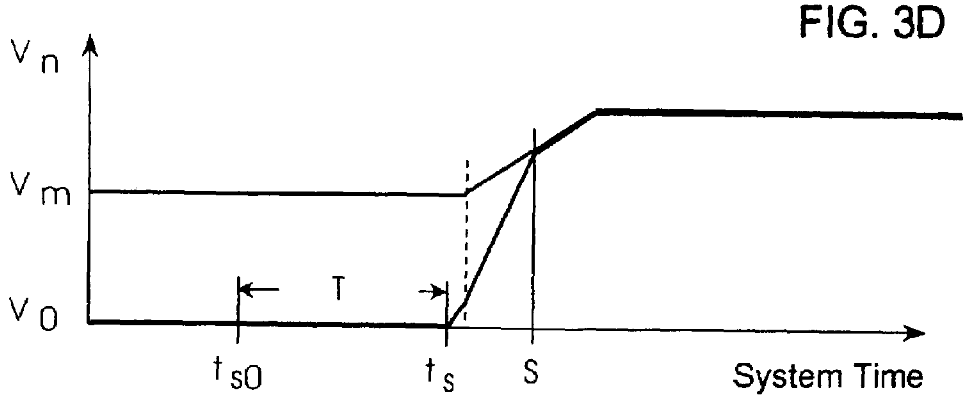
FIG. 3D is a graphic representation of a speed plot diagram of the slave drive for a changed rotational speed of the master drive with matched slave synchronization, wherein the change ends after the synchronization time.

FIG. 3D is a graphic representation of a speed plot diagram of the slave drive for a changed master rotational speed and adapted or matched slave synchronization, wherein the change ends after the synchronization time S.

In both alternatives according to FIGS. 3C and 3D, initially, the change in the operating values of the master drive is determined in a change function and prescribed to the control of the slave drives, respectively. The change function is applied to the operating values of the slave drives determined by the synchronization function, and the operating values are thus adapted to the change. If the synchronization is completed before the end of the changes in the master operating values, i.e., master and slave drive are thus synchronized before the changes to the master drive are completed, only the change function continues to be applied to the operating values of the slave drives. If the changes to the master drive are completed before the synchronization time S is reached, the synchronization is continued by the synchronization function until master and slave drives are synchronized.

FIGS. 4A to 4C illustrate a synchronization profile wherein the slave drive is accelerated so that it executes a finitely limited jolt. In this regard, when compared with the profile illustrated in FIGS. 3A to 3D, the risk that the printing material will be displaced during transport is reduced. In this regard, the profile of the jolt, limited to a finite value, is illustrated in FIG. 4A. The acceleration profile is illustrated in FIG. 4B, and the speed profile is illustrated in FIG. 4C.

In order to avoid an infinite rise, i.e., a jolt, the invention provides for the synchronization function to produce a continuous or endless acceleration profile. This is achieved by smoothing the synchronization and change function, respectively. According to the invention, provision is made, in this regard, for differential elements of the controls to convert occurring discontinuous acceleration profiles.

FIGS. 5A and 5B show the adaptation of the synchronization profile to a systematic error. In the initial state, the master drive is at the speed $v_m$, and the slave drive at the speed $v_0$.

Systematic errors can be produced when the time cycling is carried out discretely and when a calculated starting time $t_S$ for the start of the synchronization falls in a prescribed cycle interval and is thus not an integer multiple of the sampling time. In this regard, an error F would arise, which depends upon the time period between the prescribed starting time $t_S$ and the next sampling time.

Because the synchronization function is adapted to such a systematic error, the error F can be corrected directly. To this end, provision is made for the original acceleration a and the original starting time $t_S$ to be adapted to the error.

For this purpose, two variations of the synchronization are provided, wherein a lead or advance running time which has been determined by the synchronization function is taken into account. The starting time $t_S$ prescribed by the lead or advance running time $T=T_1+T_2$ is not an integer multiple of the sampling time. In this regard, $T_1$ is the lead or advance running time for achieving synchronism of the rotational speed with the theoretical start of synchronization at $t_{S0}$, and $T_2$ corresponds to the correction in order to achieve rotational-speed and angular synchronism with the start of synchronization at $t_S$. Because it is possible to start at the earliest at the next sampling time, however, a systematic error F arises, as described hereinabove. During the determination of the operating values, the systematic error F is determined and the acceleration a and the synchronization function, respectively, are adapted, so that the starting time falls exactly at a sampling time, i.e., is determined as an integer multiple of the sampling time. The systematic error F is thus corrected before the slave drive is started. The corrected start of synchronization therefore takes place at the time $t_k$, and the acceleration is accordingly determined as the value $a_s$, in order to obtain synchronism both in terms of rotational speed and angular setting or position of master and slave drives at the time S.

In this regard, it is possible, as shown in FIG. 5A, for the start of synchronization to be delayed to the next possible sampling time. As a consequence, the corrected starting time $t_k$ lies after the originally calculated time $t_S$. For this purpose, it is necessary to increase the acceleration $a_S$ of the slave drive in such a way that the determined systematic error F is compensated for after the synchronization, i.e., the synchronization time S prescribed by the synchronization function is advanced by the error F, with which the subsequent start of synchronization is compensated for.

An alternative is shown in FIG. 5B, according to which the synchronization is started at an earlier time than was prescribed by the original synchronization function. Consequently, the corrected starting time $t_k$ lies before the originally calculated time $t_S$. The start of synchronization is therefore set at the sampling time which lies before the start of synchronization $t_S$ prescribed by the original synchronization function. In this case, it is necessary to reduce the acceleration $a_S$, so that the time S of synchronism is corrected wirh respect to the error F and is therefore reached at a later time than would have been the case with the originally determined acceleration a.

We claim:

1. A method of synchronizing drive combinations having a plurality of machine drives including at least one master drive and a plurality of slave drives assigned to the master drive, the method which comprises:

providing a central control unit;

providing controls for each of the drives, including data processing and storage equipment;

synchronizing the slave drives with respect to at least one of rotational speed and angular setting as prescribed by the master drive;

determining at least one synchronization function for each of the slave drives, depending upon operating values of the master drive;

determining master-synchronous operating values for each operating time for a respective slave drive, with the at least one synchronization function; and prescribing the determined operating values for the respective slave drive.

2. The method according to claim 1, which further comprises:

effecting the prescription of the operating values of the master drive to the controls of the slave drives with the central control unit; and determining corresponding operating values for each of the associated slave drives, with the operating values of the master drive.

3. The method according to claim 1, which further comprises providing that the operating values of a respective drive include control commands for the angular setting, for the speed, for acceleration, and for at least one of command and system time.

4. The method according to claim 1, which further comprises determining a start, end and course of at least one of a synchronization and operation of a slave drive, with the synchronization function.

5. The method according to claim 1, which further comprises:

initially synchronizing one of the slave drives to the rotational speed of the master drive, with the synchronization function; and determining a synchronization function for changing the slave rotational speed for a prescribed time, after reaching the master rotational speed, to effect synchronism between the angular settings of the drives simultaneously with producing the rotational-speed synchronism.

6. The method according to claim 1, which further comprises:

determining an advance running time before a start of the synchronization for delaying the start of the synchronization, to achieve rotational-speed and angular synchronism with the synchronization function.

7. The method according to claim 1, which further comprises selecting an advance running time for determining an absolute value as a zero point for a calculation of an angular position.

8. The method according to claim 1, which further comprises at least one of changing a synchronization profile and a time for at least one of a start and an end of the synchronization for adapting the synchronization function to correct systematic errors during at least one of determination and prescription of operating values.

9. The method according to claim 1, which further comprises:

determining a change function for taking changes in operating values of the master drive during the synchronization into account; and adjusting operating values of the respective slave drive determined by the synchronization function, to a change in operating values of the master drive with the change function.

10. The method according to claim 9, which further comprises providing for the change function to include a start, course and end of the change in the operating values of the master drive.

11. The method according to claim 1, which further comprises:

decentrally determining at least one of the synchronization function and specific operating values of the respective slave drive, from a respectively associated control of the respective slave drive; and prescribing the at least one of the synchronization function and the specific operating values for operation.

12. The method according to claim 9, which further comprises continuously compensating for differences in angle and rotational speed between master and slave drives, during the synchronization.

13. The method according to claim 12, which further comprises smoothing the at least one synchronization and change function with the data processing equipment, for effecting the continuous compensation.

14. The method according to claim 1, which further comprises:

supplying the controls of the drives with a system time for generating an absolute time prescription; and synchronizing the system time via a field bus.

15. The method according to claim 14, which further comprises providing the system time from the central control unit.

16. The method according to claim 9, which further comprises determining by mathematical models at least one of the synchronization and the change function.

17. The method according to claim 16, which further comprises providing for the mathematical models to be adapted individually to the respective slave drive.

18. The method according to claim 1, which further comprises transmitting the operating values of the master drive from the central control unit to the controls of the drives via a command distributor.

19. The method according to claim 9, which further comprises:

determining set points for the operating values with set point generators; and processing at least one of the synchronization and change function with the set point generators.

20. The method according to claim 19, which further comprises providing the set point generators as integrated circuits.

21. The method according to claim 9, which further comprises storing at least one of the synchronization functions, the change functions and the operating values of the drives in storage equipment for subsequent operation.

22. A device for synchronizing a machine drive combination having at least one master drive and at least one slave drive assigned to said master drive, the at least one slave drive to be synchronized as prescribed by the master drive, the device comprising:

at least one central control unit and decentral controls being associated with the drives, including data processing and storage equipment; and at least one command distributor and data transmission equipment connecting said at least one central control unit and said controls to one another, for transmitting operating values of the master drive to said controls of the drives to transmit control commands to the drives, and for having the operating values of each drive at least one of:

calculated by the associated controls;

stored; and prescribed to the respective drive as the control commands.

23. The device according to claim 22, wherein said data transmission equipment has a field data bus connecting said controls of the individual drives to said at least one central control unit for transmitting at least one of said operating values and absolute time prescriptions for said at least one central control unit.

24. The device according to claim 23, wherein said field data bus is a CAN data bus.

25. The device according to claim 22, wherein the machine drive combination is part of a printing press.

* * * * *